(12) United States Patent
Li

(10) Patent No.: US 7,382,557 B1
(45) Date of Patent: Jun. 3, 2008

(54) FINE ADJUSTMENT MECHANISM FOR ZOOM LENS ASSEMBLY

(75) Inventor: Hung-Chih Li, Taichung (TW)

(73) Assignee: Genius Electronic Optical Co., Taichung (TW)

( * ) Notice: Subject to any disclaimer, the term of this patent is extended or adjusted under 35 U.S.C. 154(b) by 0 days.

(21) Appl. No.: 11/727,078

(22) Filed: Mar. 23, 2007

(30) Foreign Application Priority Data

Dec. 1, 2006 (TW) .............................. 95221258 U

(51) Int. Cl.
*G02B 7/02* (2006.01)
(52) U.S. Cl. ..................................................... 359/829
(58) Field of Classification Search ................ 359/822, 359/829, 830
See application file for complete search history.

(56) References Cited

U.S. PATENT DOCUMENTS

| | | | | |
|---|---|---|---|---|
| 5,510,936 A | * | 4/1996 | Aoki et al. .................. | 359/822 |
| 5,754,350 A | * | 5/1998 | Sato ............................ | 359/818 |
| 6,046,864 A | * | 4/2000 | Onda .......................... | 359/819 |
| 6,963,455 B2 | * | 11/2005 | Nomura et al. ............. | 359/694 |
| 2007/0196094 A1 | * | 8/2007 | Chiang ....................... | 396/144 |

* cited by examiner

*Primary Examiner*—Jordan Schwartz
*Assistant Examiner*—James C Jones
(74) *Attorney, Agent, or Firm*—Browdy & Neimark

(57) ABSTRACT

A fine adjustment mechanism for a zoom lens assembly having a zoom mechanism and for lineally moving the zoom mechanism is disclosed to include a barrel and an adjustment ring sleeved onto the barrel. The zoom mechanism is axially moveably mounted to the barrel. The first adjustment ring is provided at an inner periphery surface thereof with an internal thread engaged with an external thread provided at an outer periphery surface of the barrel such that the adjustment ring is axially moveable along the barrel when the adjustment ring is rotated relative to the barrel. The adjustment ring has three protrusions equiangularly spaced on an end face thereof and supporting the zoom mechanism such that the zoom mechanism is driven by the adjustment ring to move axially relative the said barrel when the adjustment ring is rotated relative to the barrel.

3 Claims, 4 Drawing Sheets

FINE ADJUSTMENT MECHANISM FOR ZOOM LENS ASSEMBLY

BACKGROUND OF THE INVENTION

1. Field of the Invention

The present invention relates generally to a zoom lens assembly and more specifically, to a fine adjustment mechanism for linearly adjusting the initial position of a zoom mechanism of the zoom lens assembly.

2. Description of the Related Art

To fit different requirements for different depth of field and different visual field when taking pictures, a zoom mechanism is installed in the lens assembly to provide a continuously adjustable focal length.

However, because the parts of a zoom mechanism have a dimensional error during fabrication or installation, a relatively greater travel path is provided for the zoom mechanism to prevent a zoom failure due to the dimensional error. Although a zoom mechanism has a relatively greater travel path, for example the range between position A and position B in FIG. 1, the needed travel path of the zoom operation is the range between position a and position b in practice. Beyond the range between position a and position b, the lens cannot show the image clearly. Therefore, after assembly of a zoom mechanism, the manufacturer will use a locating ring to support the zoom mechanism, limiting the initial zoom position for the zoom mechanism. However, because the locating ring is directly affixed to the barrel that holds the zoom mechanism, the dimensional error of the related parts must be lowered to assure a satisfactory yield rate after assembly. Further, because the locating ring has the whole surface of one side thereof supporting the zoom mechanism, the parallelism is critical, and therefore the manufacturing of the zoom system is difficult.

SUMMARY OF THE INVENTION

The present invention has been accomplished under the circumstances in view. It is therefore one objective of the present invention to provide a fine adjustment mechanism for a zoom lens assembly, which allows fine adjustment of the initial zoom position of a zoom mechanism of the zoom lens assembly so that the manufacturing difficulty of the related parts is reduced.

It is another objective of the present invention to provide a fine adjustment mechanism for a zoom lens assembly, which assures the parallelism of the zoom lens.

To achieve these objectives of the present invention, the fine adjustment mechanism for linearly moving a zoom mechanism of a zoom lens assembly comprises a barrel and an adjustment ring sleeved onto the barrel. The barrel is provided for the mounting of the zoom mechanism for allowing axial movement of the zoom mechanism along the barrel. The barrel has a first adjustment portion provided at an outer periphery surface thereof. The adjustment ring has a second adjustment portion provided at an inner periphery surface thereof and coupled to the first adjustment portion in such a manner that the adjustment ring is axially moveable along the barrel when the adjustment ring is rotated relative to the barrel. The adjustment ring has at least three protrusions spaced on an end face thereof for supporting the zoom mechanism to move the zoom mechanism axially relative to the barrel when the adjustment ring is rotated relative to the barrel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
FIG. 1 is a schematic drawing illustrating the initial zoom position of a zoom lens assembly.
Figure 2:
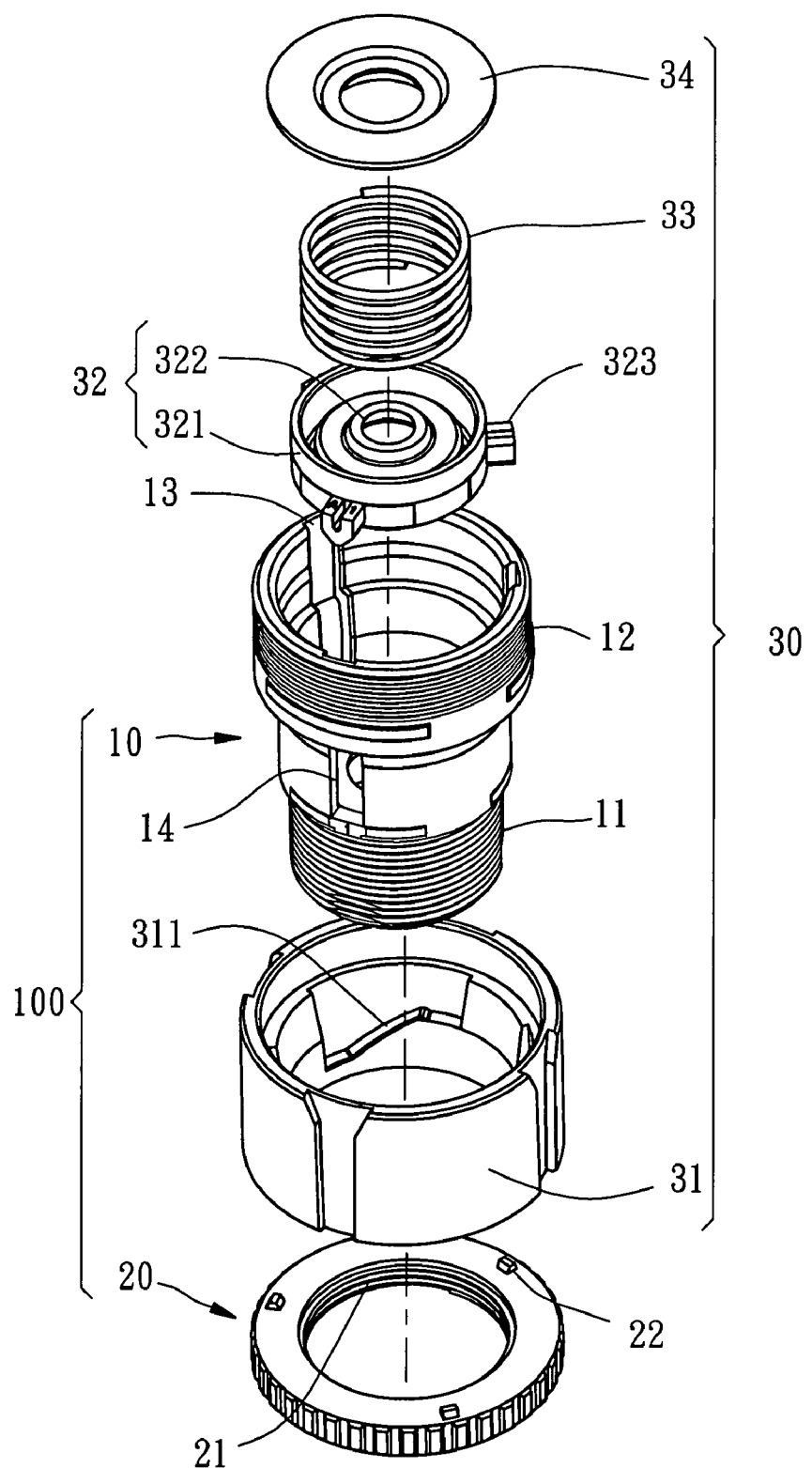
FIG. 2 is an exploded view of a preferred embodiment of the present invention.
Figure 3:
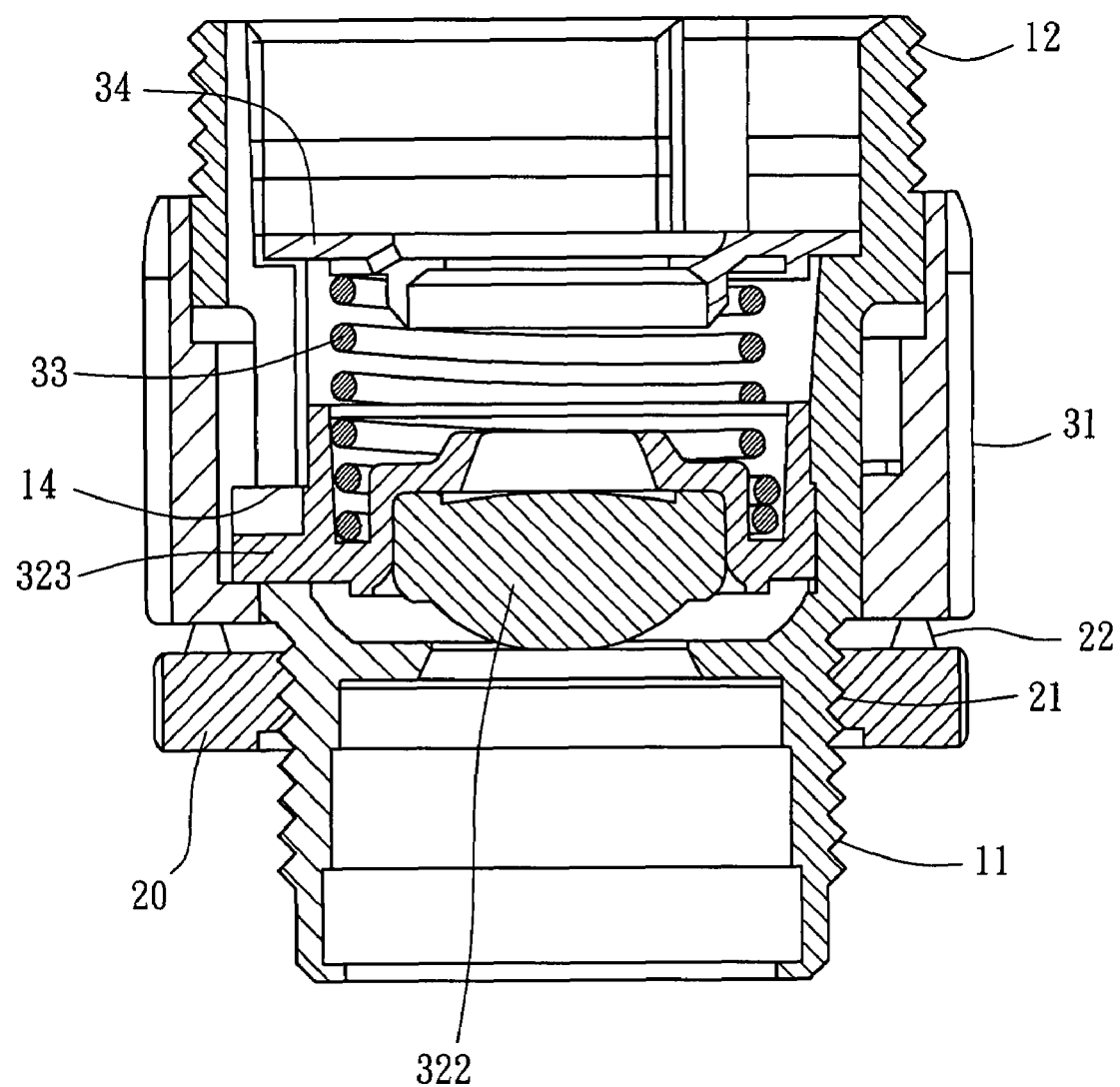
FIG. 3 is a sectional assembly view of the preferred embodiment of the present invention.
Figure 4:
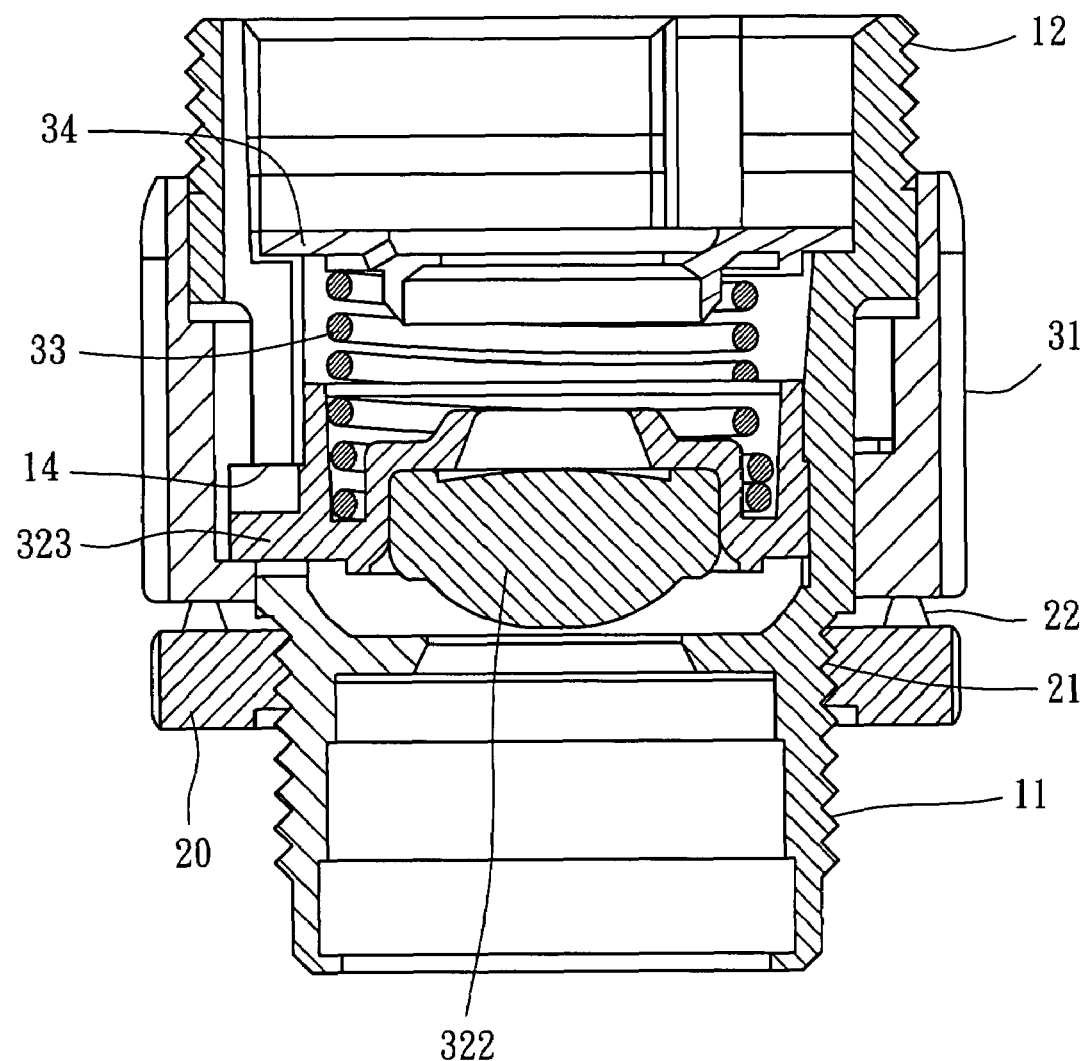
FIG. 4 is similar to FIG. 3, but showing that the zoom lens is adjusted to the accurate initial zoom position.

As shown in FIGS. 2-4, a fine adjustment mechanism 100 for a zoom lens assembly in accordance with a preferred embodiment of the present invention comprises a barrel 10 and an adjustment ring 20.

The barrel 12 is a hollow cylindrical member for the mounting of a zoom mechanism 30 of the zoom lens assembly. The barrel 12 is provided at the bottom and top parts of the outer periphery surface thereof with a first adjustment portion 11 and a connecting portion 12 respectively. According to this embodiment, the first adjustment portion 11 and the connecting portion 12 each are an external thread. The connecting portion 12 is for the mounting of an external member (not shown). The barrel 12 further has three grooves 13 equiangularly spaced around the inner periphery surface and extending in axial direction, and three longitudinal sliding slots 14 cut through the outer and inner peripheral surfaces and equiangularly spaced between the first adjustment portion 11 and the connecting portion 12.

The adjustment ring 20 is a hollow ring. The adjustment ring 20 is provided at its inner periphery surface with a second adjustment portion 21. According to this embodiment, the second adjustment portion 21 is an internal thread threaded onto the first adjustment portion (external thread) 11 of the barrel 10 so that the adjustment ring 20 can be displaced along the axis of the barrel 10 through a rotary motion. The adjustment ring 20 has three protrusions 22 equiangularly spaced on one end face, namely, the top end face.

For further understanding of the features of the present invention, one embodiment of the zoom mechanism is explained hereinafter.

The zoom mechanism 30 comprises a zoom ring 31, a zoom lens set 32, a spring member 33 and a stop plate 34. The zoom ring 31 is a hollow ring sleeved onto the barrel 10 and supported on the protrusions 22 at the top end face of the adjustment ring 20. The zoom ring 31 has three grooves 311 equiangularly spaced around the inner periphery surface thereof. The zoom lens set 32 comprises a lens holder 321 and a lens group 322 fixedly mounted in the lens holder 321. The lens holder 321 is a circular member suspended inside the barrel 10, having three lugs 323 equiangularly spaced around the outer periphery surface and respectively inserted through the longitudinal sliding slots 14 of the barrel 10 and respectively supported in the zoom grooves 311 inside the zoom ring 31. Therefore, rotating the zoom ring 31 causes axial displacement of the zoom lens set 32 relative to the barrel 10 along the longitudinal sliding slots 14 of the barrel 10. The spring member 33 is mounted inside the barrel 10, having one end stopped at the zoom lens set 32. The stop plate 34 is a ring plate fixedly mounted inside the barrel 10 and pressed on the other end of the spring member 33 so that the spring member 33 holds down the zoom lens set 32.

After understanding of the parts of the fine adjustment mechanism 100 and its mounting with the zoom mechanism 30, the operation and features of the fine adjustment mechanism 100 are described hereinafter.

After assembly of the zoom lens assembly, the zoom lens set 32 may be in an inaccurate initial zoom position (see FIG. 3). At this time, rotating the adjustment ring 20 through a suitable number of turns relative to the barrel 10 may resolve this problem. When rotating the adjustment ring 20 relative to the barrel 10, the zoom ring 31 is forced by the adjustment ring 20 to move axially, such that the zoom lens set 32 is axially moved with the zoom ring 31 along the longitudinal sliding slots 14 of the barrel 10 to the accurate initial zoom position (see FIG. 4). When reached to the accurate initial zoom position, the zoom lens 322 shows the image clearly. At this time, an adhesive dispenser can be used to affix the adjustment ring 20 to the barrel 10 with an adhesive.

Therefore, by means of rotating the adjustment ring 20 to cause an axial displacement of the zoom mechanism 30, the zoom lens 322 is moved to the initial zoom position to show the image clearly. Because the invention allows fine adjustment of the initial zoom position of the zoom mechanism 30 through the adjustment ring 20, the manufacturing dimensional error of the parts is less critical, and therefore the manufacturing difficulty of the related parts is reduced. Further, the adjustment ring 20 uses the three equiangularly spaced protrusions 22 to support the zoom mechanism 30, the control of the parallelism between the adjustment ring 20 and the zoom mechanism 30 is easy.

When the user rotates the zoom ring 31, zoom in/out operation is proceeding. However, because the zoom mechanism is not within the point of interest of the present invention, no further detailed description in this regard is necessary. It is to be understood that the aforesaid zoom mechanism 30 is disclosed simply for illustrative purpose. It is an example of various zoom mechanisms, but not a limitation of the present invention.

Further, in the aforesaid preferred embodiment of the present invention, the first adjustment portion 11 is an external thread and the second adjustment portion 21 is an internal thread. In actual practice, the first adjustment portion and the second adjustment portion can be made in any of a variety of other forms that converts a rotary motion into a linear motion. Further, in the aforesaid preferred embodiment, the adjustment ring 20 uses the three equiangularly spaced protrusions 22 to support the zoom ring 31 of the zoom mechanism 30. Alternatively, the adjustment ring 20 can be made having four, five, or more than five equiangularly spaced protrusions for supporting the zoom ring 31 of the zoom mechanism 30.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fine adjustment mechanism for a zoom lens assembly, said fine adjustment mechanism comprising:
   a barrel formed as a unit engaged to a zoom mechanism having a zoom ring which is moveable on said barrel along the axis of the barrel, said barrel having a first threaded adjustment portion provided on an outer periphery surface at a bottom end of the barrel;
   an adjustment ring provided on an inner periphery surface thereof with a second threaded adjustment portion threadedly engaged to said first threaded adjustment portion so that said adjustment ring is moveable along the axis of said barrel when said adjustment ring is rotated relative to said barrel, said adjustment ring having at least three protrusions projecting up from an upper face thereof supporting said zoom ring for movement along the axis of said barrel when said adjustment ring is rotated relative to said barrel, and
   wherein said barrel has a plurality of longitudinal sliding slots through which parts of said zoom mechanism are respectively extensible to guide said zoom mechanism along the axis of said barrel.

2. The fine adjustment mechanism as claimed in claim 1, wherein said barrel has a threaded connecting portion on an outer periphery surface thereof for connection of an external member.

3. The fine adjustment mechanism as claimed in claim 1, wherein said protrusions of said adjustment ring are equiangularly spaced on the upper face of said adjustment ring.

* * * * *